Feb. 16, 1932. L. B. SAWYER 1,845,444
INSULATING MATERIAL
Filed Aug. 28, 1929
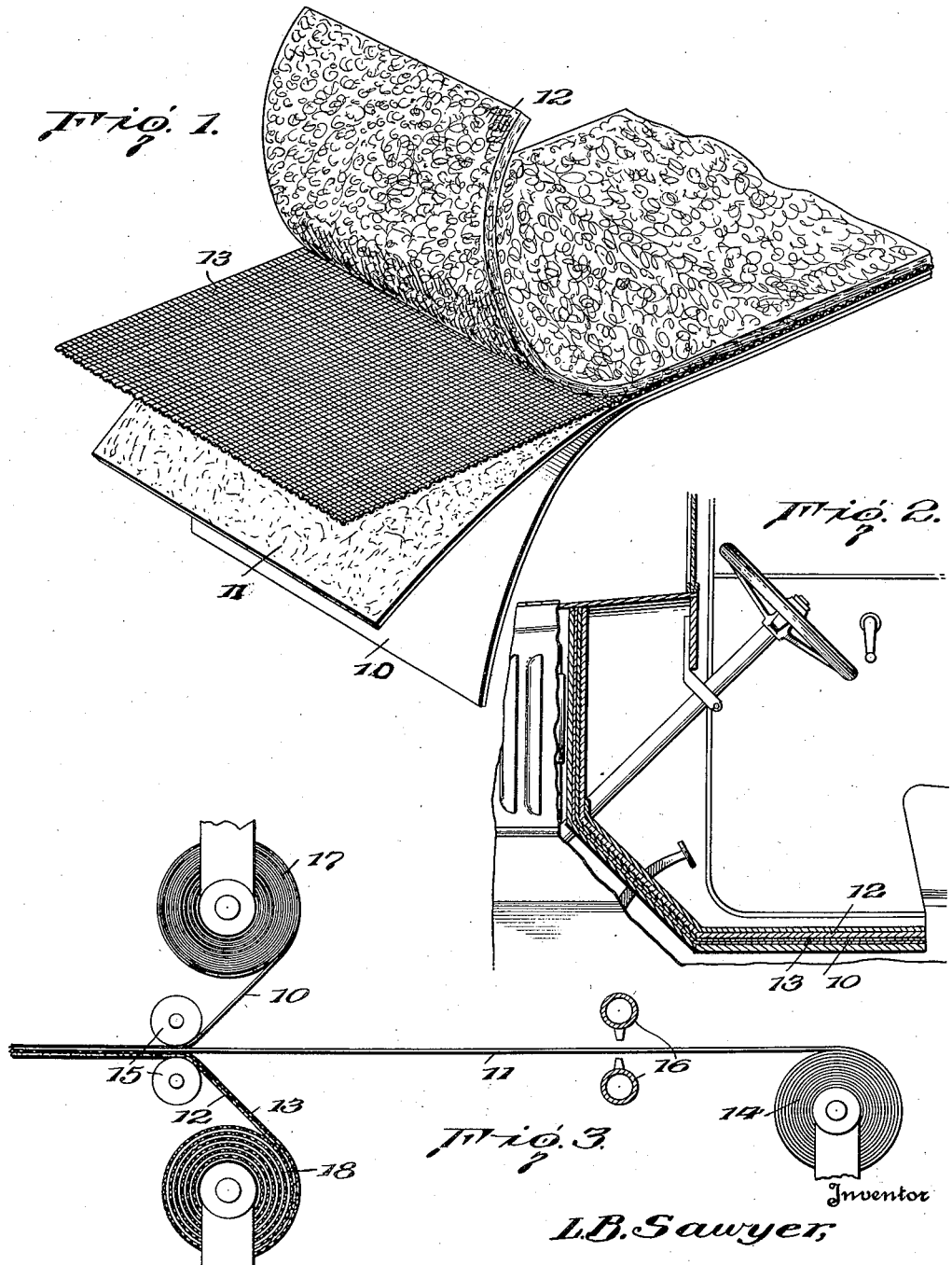
L. B. Sawyer, Inventor Patented Feb. 16, 1932

1,845,444

UNITED STATES PATENT OFFICE

LEICESTER B. SAWYER, OF AUBURN, NEW YORK, ASSIGNOR TO THE PROTECTAHOOD CORPORATION, OF AUBURN, NEW YORK, A CORPORATION OF NEW YORK

INSULATING MATERIAL

Application filed August 28, 1929. Serial No. 389,006.

This invention relates to improvements in insulating materials. More particularly, the invention contemplates a heat insulating and sound deadening material especially adapted for use in automobiles for the purpose of increasing the comfort of the passengers.

It is a well known fact that automobile manufacturers of today are constantly attempting to utilize higher pressures in their motors and as a result the heat units dissipated or radiated from the motors have increased tremendously. This increased radiation of heat materially affects the comfort of the passengers of the automobile, especially those occupying the seat immediately behind the motor. The heated air not only gains access to the seat compartments but the floor of the machine becomes rather hot and radiates an appreciable amount of heat. In all, the conditions are such that a ride of any duration, especially in the warmer months or in a closed type of car, is very tiresome and wearing on the passengers and particularly the operator. The manufacturers of automobiles, appreciating these conditions, have been directing their attention for some time to the problem of rendering their cars more comfortable by eliminating or minimizing the cause of the discomfort. To this end, the present invention seeks to provide a novel heat insulating material especially adapted for use as a floor covering in automobiles, and which will also possess sound deadening properties.

A still further object is to produce a heat insulating material having a high degree of resiliency and flexibility and being, at the same time, exceedingly tough so that it can not be easily torn and possessing good wearing qualities. Resiliency is important as the material is adapted for use beneath or in conjunction with the rubber mat generally utilized as a floor covering in automobiles. Flexibility is likewise important because, the material being pliant, no preliminary molding or shaping is required, regardless of where it is used in the car. For instance, where the present material is used on the dash a sheet of it will readily conform to the contour of the dash without the necessity of preliminarily shaping the material.

It is preferred that the heat insulating element be of a non-cellular character, such as asbestos, and the asbestos is combined with other elements that lend protection thereto and that impart resiliency and toughness to the finished product. In view of this a further object is to provide a novel method of combining the asbestos and other elements wherein the adhesive used in securing the several elements together is so applied to the asbestos that there is no danger of the latter tearing or pulling to pieces.

In the accompanying drawings illustrating the preferred embodiment of the present invention,—

Figure 1 is a perspective view of a section of the heat insulating material, the several thicknesses or elements being shown as partially pulled apart or separated for purposes of illustration;

Fig. 2 is a sectional view showing the present material used in conjunction with a rubber mat on the floor and dash of an automobile; and Fig. 3 is a diagrammatical illustration of the preferred method of producing the present material.

While the present material may, of course, be used for heat insulating and sound deadening purposes in any situation it has been designed primarily for use in automobiles. In connection with such usage it is essential that the material prevent, to the highest degree possible, the admission of heat from the motor to the compartment of the front seat of the car. For this reason, a sheet of non-cellular material, preferably sheet asbestos, indicated at 11 is relied upon principally for the heat insulating properties of the finished product. The asbestos paper 11, however, cannot withstand much abrasion, so that it is preferred to line one side thereof with a protective covering, as, for instance, the layer of pressed felt 10. On the other side of the asbestos paper there is provided means for preventing tearing of the finished product, such means also preventing disintegration of the element that is incorporated in the finished product for imparting resiliency to the product, for increasing its heat insulating properties, and for bettering its sound deadening qualities.

Such means consist of a layer of pressed fibrous matter, such as the layer of pressed jute fibre indicated at 12, said fibre being assembled, so to speak, on the burlap 13 and applied to the sheet of asbestos by any suitable adhesive. It will be noted that the layer of jute fibre is comparatively thick. This increases the resiliency of the finished product, a characteristic that cannot be obtained with a woven material except at a prohibitive cost. This resilient layer of pressed fibre 12 is essential because it not only prevents heat being radiated from the asbestos sheet, but on account of the resiliency of this fibrous layer the life of a rubber mat superimposed thereon, as illustrated in Fig. 2, is greatly prolonged. Likewise, the use of the burlap 13, or its equivalent, is advantageous, as it acts not only as a carrier for the pressed jute fibre, but also prevents tearing of the asbestos without detracting from the flexibility of the finished product, a feature that is important, as above pointed out.

As the sheet of asbestos paper is rather easily torn, especially when damp with the adhesive used in securing the felt 10 and jute covering 12 thereto, it is preferred that these elements be assembled as shown in Fig. 3. In this proposed method the continuous web of asbestos paper 11 is fed from a roll 14 to and between suitable pressure rolls 15. At a point between roll 14 and rolls 15 the opposite sides of the web are sprayed with suitable adhesive from jets 16, the spray or volume of adhesive being controlled in any desired manner. As the web, coated with the adhesive, passes between rolls 15, the strip of felt 10 and the layer of jute fibre 12 carried by the burlap 13 are likewise fed between said rolls, one on each side of the asbestos. The felt 10 and jute fibre 12 may be fed from suitable rolls 17, 18. With this method, there is no tension on the asbestos except the pull exerted by the pressure rollers 15. In other words, no rolls are necessary for applying the adhesive to the asbestos. This is important because, where rolls are utilized for applying the adhesive, the asbestos paper, being damp and subjected to this additional tension, is quite frequently torn. Again, the glue or other adhesive hardens on the rolls and particles of the asbestos paper adhere thereto, with the result that the paper is at least partially, if not totally, destroyed.

Heat insulating material made according to the present invention has been found to give excellent results in road tests and has been adopted as standard equipment in some instances. Of course, the entire body of the car might be lined with this material, but where only the dash and floor in the front seat compartment have been lined the passengers have been noticeably more comfortable. Not only are the passengers more comfortable, so that long trips are not as tiresome, but the life of the rubber matting generally used is greatly prolonged. This is true, because the resiliency of the present material gives the rubber a better cushioning effect, and, by preventing the hot air from the motor gaining access to the rubber, the latter does not dry out. It will not, therefore, disintegrate or wear out so readily.

What I claim is:

1. In a heat insulating and sound deadening material, a sheet of asbestos, a layer of pressed felt on one side thereof, and a comparatively thick, resilient layer of pressed fibre on the opposite side thereof, and a carrier for said fibre interposed between the fibre and the asbestos.

2. A flexible sheet-like body of heat insulating material comprising a layer of asbestos, a protective covering on one side of said asbestos, a comparatively thick layer of pressed jute fibre on the opposite side of said asbestos, and a layer of burlap interposed between said asbestos and jute fibre.

LEICESTER B. SAWYER.